(12) United States Patent
Watanabe et al.

(10) Patent No.: US 7,040,717 B2
(45) Date of Patent: May 9, 2006

(54) NEGATIVE PRESSURE BOOSTING DEVICE

(75) Inventors: Satoru Watanabe, Higashimatsuyama (JP); Hidefumi Inoue, Higashimatsuyama (JP)

(73) Assignee: Bosch Automotive Systems Corporation, Tokyo (JP)

( * ) Notice: Subject to any disclaimer, the term of this patent is extended or adjusted under 35 U.S.C. 154(b) by 0 days.

(21) Appl. No.: 10/327,087

(22) Filed: Dec. 24, 2002

(65) Prior Publication Data

US 2003/0230931 A1    Dec. 18, 2003

(30) Foreign Application Priority Data

Jun. 14, 2002    (JP) .............................. 2002-173906

(51) Int. Cl.
*B60T 8/34* (2006.01)

(52) U.S. Cl. .................. 303/114.3; 91/369.3; 91/376 R

(58) Field of Classification Search .... 91/369.1–369.4, 91/376.12; 303/114.1, 114.3; 188/347–358
See application file for complete search history.

(56) References Cited

U.S. PATENT DOCUMENTS

| | | | |
|---|---|---|---|
| 4,242,943 A * | 1/1981 | Nakamura et al. ......... | 91/369.1 |
| 5,323,685 A | 6/1994 | Wagner | |
| 6,203,118 B1 * | 3/2001 | Takayama et al. ....... | 303/113.4 |
| 6,273,526 B1 | 8/2001 | Wachi et al. | |
| 6,282,896 B1 * | 9/2001 | Wachi et al. .............. | 60/547.2 |
| 6,345,565 B1 * | 2/2002 | Tsubouchi et al. ............ | 91/367 |
| 6,408,738 B1 * | 6/2002 | Harth et al. ................ | 91/369.2 |
| 6,516,704 B1 * | 2/2003 | Inoue et al. .............. | 91/376 R |
| 6,564,692 B1 * | 5/2003 | Inoue et al. ................ | 91/369.3 |
| 6,568,768 B1 * | 5/2003 | Oka et al. ................. | 303/113.3 |
| 6,652,040 B1 * | 11/2003 | Oka et al. ................. | 303/114.1 |
| 6,672,198 B1 * | 1/2004 | Friedsam et al. ............. | 91/367 |
| 6,715,401 B1 * | 4/2004 | Takasaki et al. ........... | 91/369.2 |
| 2002/0069751 A1 | 6/2002 | Inoue et al. | |

FOREIGN PATENT DOCUMENTS

| | | |
|---|---|---|
| DE | 197 43 843 | 4/1999 |
| DE | 197 55 442 | 6/1999 |

* cited by examiner

*Primary Examiner*—Chris Schwartz
(74) *Attorney, Agent, or Firm*—Manabu Kanesaka

(57) ABSTRACT

In a negative pressure boosting device of the present invention, upon depression of a pedal at a normal speed, an input shaft 11 and a valve plunger 10 move forward to close a vacuum valve 15 and open an atmospheric valve 16 and a power piston 5, a valve body 4, and an output shaft 24 move forward. In the initial stage of operation, hooks 27c and 31a are not engaged with each other so that a cylindrical member 27 does not move forward, thereby shortening the stroke of the input shaft 11 as compared to a conventional one. Upon rapid depression of the pedal, a press face 10a presses a pressed face 27e so as to deform an engaging arm portion 27b, thereby disengaging the hooks 27c and 31a from each other. The cylindrical member 27 is moved backward by a spring 30 to push a vacuum valve portion 12b so that the atmospheric valve portion 12a is spaced apart from the atmospheric valve seat 14 more rapidly than that of the service braking, thereby increasing the jumping amount and thus rapidly intensifying the output.

7 Claims, 6 Drawing Sheets

NEGATIVE PRESSURE BOOSTING DEVICE

BACKGROUND OF THE INVENTION

The present invention relates to a negative pressure boosting device used as a brake booster or the like and, more particularly, to a negative pressure boosting device capable of shortening the stroke of an input shaft thereof in the initial stage of its normal operation and capable of providing larger output in the event of emergency braking operation as compared to the normal operation.

Conventionally, a negative pressure boosting device utilizing negative pressure is used as a brake booster in an automobile such as a passenger car. Upon depression of the brake pedal for normal braking operation, an input shaft is moved forward to move a valve plunger, connecting the input shaft, forward. Accordingly, a valve element of a control valve arranged in the valve body is seated on a vacuum valve seat similarly formed in the valve body so as to close a vacuum valve, while an atmospheric valve seat formed in the valve plunger is spaced apart from the valve element of the control valve so as to open an atmospheric valve. Accordingly, a variable pressure chamber into which a negative pressure is introduced in the inoperative state is isolated from a constant pressure chamber into which the negative pressure is always introduced. At the same time, the variable pressure chamber is in communication with the atmosphere. Therefore, the atmosphere is introduced into the variable pressure chamber through the open atmospheric valve, resulting in a pressure difference between the variable pressure chamber and the constant pressure chamber. Because of the pressure difference, the power piston is moved forward so that the valve body and an output shaft are moved forward. In this manner, the negative pressure boosting device boosts the input (i.e. pedaling force) of the input shaft in accordance with a predetermined servo ratio to output. The output of the negative pressure boosting device moves a piston of a master cylinder, whereby the master cylinder produces a master cylinder pressure. With this master cylinder pressure, wheel cylinders are actuated, thereby operating the service braking.

Generally, the negative pressure boosting device has a jumping (JP) characteristic. That is, as shown in FIG. 6, no reaction is transmitted from the output shaft to the input shaft when the input is small, while reaction is transmitted to the input shaft via a reaction mechanism to substantially generate a predetermined output when the input is somewhat large.

As the brake pedal is released so that the input shaft is moved backward, the atmospheric valve seat abuts on the valve element of the control valve to close the atmospheric valve and, at the same time, the valve element is spaced apart from the vacuum valve seat to open the vacuum valve, whereby the variable chamber is isolated from the atmosphere and is in communication with the constant pressure chamber. Then, the atmosphere introduced in the variable pressure chamber is discharged to a negative pressure source through the open vacuum valve and the constant pressure chamber so that the negative pressure is introduced into the variable pressure chamber, thereby canceling the pressure difference between the variable pressure chamber and the constant pressure chamber. As a result of this, the power piston is moved backward so that the valve body and output shaft are moved backward to their inoperative positions, whereby the output of the negative pressure boosting device dies out. Therefore, the piston of the master cylinder is moved backward to its inoperative position so that the master cylinder pressure dies out, thereby canceling the service braking.

By the way, in a brake system including the master cylinder and the wheel cylinders, a predetermined amount of brake fluid should be supplied from the master cylinder to the wheel cylinders until the wheel cylinders actually generate braking force after the master cylinder is actuated to start the supply of brake fluid to the wheel cylinders. The travel of the piston of the master cylinder until the wheel cylinders actually generate braking force is called loss stroke. For the loss stroke, the piston of the master cylinder must have longer stroke. This makes the output shaft and the input shaft of the negative pressure boosting device longer and, as a result, makes the pedal stroke longer.

Accordingly, Japanese Patent Unexamined Publication No. H05-193486 discloses a negative pressure boosting device which can shorten the stroke of an input shaft of the negative pressure boosting device, i.e. shorten the pedal stroke, even with such a loss stroke in the brake system.

The negative pressure boosting device disclosed in the publication is provided with a sleeve having a valve seat of a vacuum valve (hereinafter, referred to as "vacuum valve seat") at a rear portion thereof and slidably fitted to the inner periphery of the valve body. The sleeve is always urged by a spring in a direction of opening the vacuum valve. When the negative pressure boosting device is not operated, the rearmost position of the sleeve is defined by a key member restricting the backward movement of the valve body. As the input shaft is moved forward by the depression of a brake pedal, the vacuum valve is closed and an atmospheric valve is opened in the same manner as mentioned above so that the atmosphere is introduced into a variable chamber to move a power piston, the valve body, and an output shaft forward. Accordingly, the negative pressure boosting device outputs.

In the initial stage of the operation of the negative pressure boosting device, until the key member abuts on a stopper formed in the valve body and starts to move forward together with the valve body, the sleeve is held at its initial position by the spring and the vacuum valve and the atmospheric valve are held to balance with each other so that only the valve body moves relative to the input shaft. Therefore, the stroke of the valve body or the output shaft should be longer than the stroke of the input shaft. In other words, the device disclosed in the publication has a shorter stroke of the input shaft, i.e. a shorter pedal stroke, compared to the conventional negative pressure boosting device for the same stroke of the output shaft.

On the other hand, in a brake system, there is a case, such as for emergency braking, that it is necessary to produce desired large braking force more rapidly than that of the service braking operation immediately after the depression of the brake pedal. Therefore, it has been traditionally desirable to employ a brake assist (hereinafter, referred to as "BA") control system in a brake system. By employing the BA control system, large braking force can be rapidly produced even with small pedaling force. For improving the brake boosting control, it is preferable to not only shorten the pedal stroke as described above but also perform the BA control.

To shorten the stroke of the input shaft in the initial stage of the service braking operation and to perform the BA control in the event of the emergency braking operation, there is an idea of modifying the negative pressure boosting device disclosed in the aforesaid publication to be capable of outputting desired large braking force more rapidly than that of the service braking, for example, in the event of emergency braking.

However, it is difficult to output desired large braking force more rapidly than that of the service braking operation, in the event of emergency braking, that is, it is difficult to exhibit the BA control in the negative pressure boosting device because the output must be the same for the same input applied to the input shaft even in the event of emergency braking operation.

SUMMARY OF THE INVENTION

It is an object of the present invention to provide a negative pressure boosting device capable of performing improved boosting control, with shortening the stroke of an input member or an input shaft and, in addition, producing desired large output more rapidly than that of service braking, with small input in the event of emergency braking operation.

To achieve the above-mentioned object, a negative pressure boosting device of the present invention is a negative pressure boosting device of which an output member is actuated to produce an output by the introduction of atmosphere during operation of an input member and is characterized by comprising: an input stroke shortening means for shortening the stroke of said input member relative to the stroke of said output member in the initial stage of operation; and a rapid output intensifying means for intensifying said output more rapidly than that of the normal operation when said input member is operated more rapidly than that for the normal operation.

Further, a negative pressure boosting device of the present invention comprises at least: a valve body which is arranged to freely move forward and backward relative to a space defined by a shell and airtightly and slidably penetrates said shell; a power piston which is connected to said valve body and divides said space into a contact pressure chamber in which negative pressure is introduced and a variable pressure chamber in which atmosphere is introduced during operation; a valve plunger which is movably arranged in said valve body; an input shaft which is connected to said valve plunger and is arranged in said valve body to allow the forward and backward movement of said input shaft relative to said valve body; an output shaft which moves together with said valve body by the operation of said power piston to produce an output; a vacuum valve which is arranged in said valve body and is controlled by the forward and backward movement of said valve plunger to impede or allow the communication between said constant pressure chamber and said variable pressure camber; and an atmospheric valve which is arranged in said valve body and is controlled by the forward and backward movement of said valve plunger to impede or allow the communication between said variable pressure camber and the atmosphere, and is characterized by comprising: an input stroke shortening means for shortening the stroke of said input shaft relative to the stroke of said output shaft in the initial stage of operation; and a rapid output intensifying means for intensifying said output more rapidly than that of the normal operation when said input shaft is operated more rapidly than that for the normal operation.

The present invention is further characterized in that said vacuum valve comprises a vacuum valve member which is arranged in said valve body and a vacuum valve seat which is arranged movably relative to said valve body and on which said vacuum valve member can be seated, and that said input stroke shortening means moves said valve body relative to said vacuum valve seat in the initial stage of operation and then moves said vacuum valve seat together with said valve body after said valve body is moved a predetermined distance relative to said vacuum valve seat.

The present invention is furthermore characterized in that said rapid output intensifying means is actuated when said input shaft is operated more rapidly than that for the normal operation and rapidly opens said atmospheric valve to increase the jumping amount so as to obtain an output larger than that of the normal operation.

The present invention is still characterized in that said atmospheric valve comprises an atmospheric valve member which is arranged in said valve body and an atmospheric valve seat which is provided on said valve plunger and on which said atmospheric valve member is seated, and that said rapid output intensifying means is actuated when said input shaft is operated more rapidly than that for the normal operation and moves said vacuum valve, said atmospheric valve member, and said atmospheric valve seat backward relative to said valve body more largely than that of the normal operation.

The present invention is still further characterized in that said vacuum valve comprises a vacuum valve member which is arranged in said valve body and a vacuum valve seat which is arranged movably relative to said valve body and on which said vacuum valve member can be seated; said atmospheric valve comprises an atmospheric valve member which is arranged in said valve body and an atmospheric valve seat which is provided on said valve plunger and on which said atmospheric valve member is seated; said vacuum valve member and said atmospheric valve member are movable together with each other; a cylindrical member having said vacuum valve seat on one end thereof is disposed airtightly and slidably relative to said valve body; said input stroke shortening means comprises a valve body-side engaging portion provided on said valve body and a cylindrical member-side engaging portion provided on said cylindrical member which is set to have a predetermined distance from said valve body-side engaging portion when the negative pressure booster is not operated, wherein said valve body-side engaging portion and said cylindrical member-side engaging portion are not engaged with each other in the initial stage of operation, while said valve body-side engaging portion and said cylindrical member-side engaging portion are engaged with each other after said valve body moves relative to said cylindrical member to cancel said predetermined distance therebetween, thereby moving said cylindrical member together with said valve body; and said rapid output intensifying means moves said atmospheric valve member and said atmospheric valve seat backward more largely than that of the normal operation by that said cylindrical member pushes said vacuum valve member when said input shaft is operated more rapidly than that for the normal operation.

In addition, the present invention is characterized in that said valve body is provided with the other vacuum valve seat of said vacuum valve, wherein said vacuum valve member is seated on said the other vacuum valve seat at the beginning of operation in which the control for shortening the stroke of said input shaft is performed by said input stroke shortening means, and said vacuum valve member is seated on the vacuum valve seat provided on said cylindrical member during and after the operation in which the control for shortening the stroke of said input shaft is performed by said input stroke shortening means.

According to the negative pressure boosting device of the present invention having the aforementioned structure, the stroke of the input member can be shortened in the initial stage of the operation relative to the stroke of the output member by the input stroke shortening means and, in addition, the output can be intensified more rapidly than that of the normal operation when the input member is operated more rapidly than that for the normal operation by the rapid output intensifying means.

Further, according to the negative pressure boosting device of the present invention, the stroke of the input shaft can be effectively shortened in the initial stage of the operation relative to the stroke of the output shaft by the input stroke shortening means and, in addition, the output can be intensified more rapidly than that of the normal operation when the input shaft is operated more rapidly than that for the normal operation by the rapid-output intensifying means.

Therefore, the negative pressure boosting device of the present invention can perform improved boosting control.

By employing the negative pressure boosting device of the present invention as a brake booster, even if a brake system has a loss stroke as mentioned above, the loss stroke can be effectively cancelled with shortening the pedal stroke of a brake pedal in the initial stage of braking operation. In addition, in the event of emergency braking, the braking force can be intensified more rapidly than that of the service braking, thereby rapidly and effectively performing the emergency braking.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 4(a)–4(c) are illustrations for explaining the operation of hooks in the negative pressure boosting device shown in FIG. 1, wherein FIG. 4(a) is a sectional view partially showing the inoperative state where the hooks are not engaged with each other, FIG. 4(b) is a sectional view partially showing a state on the way of operation, and FIG. 4(c) is a sectional view partially showing the state where the hooks are engaged with each other;

DESCRIPTION OF THE PREFERRED EMBODIMENTS

Hereinafter, embodiments of the present invention will be described with reference to the attached drawings.

Figure 1:
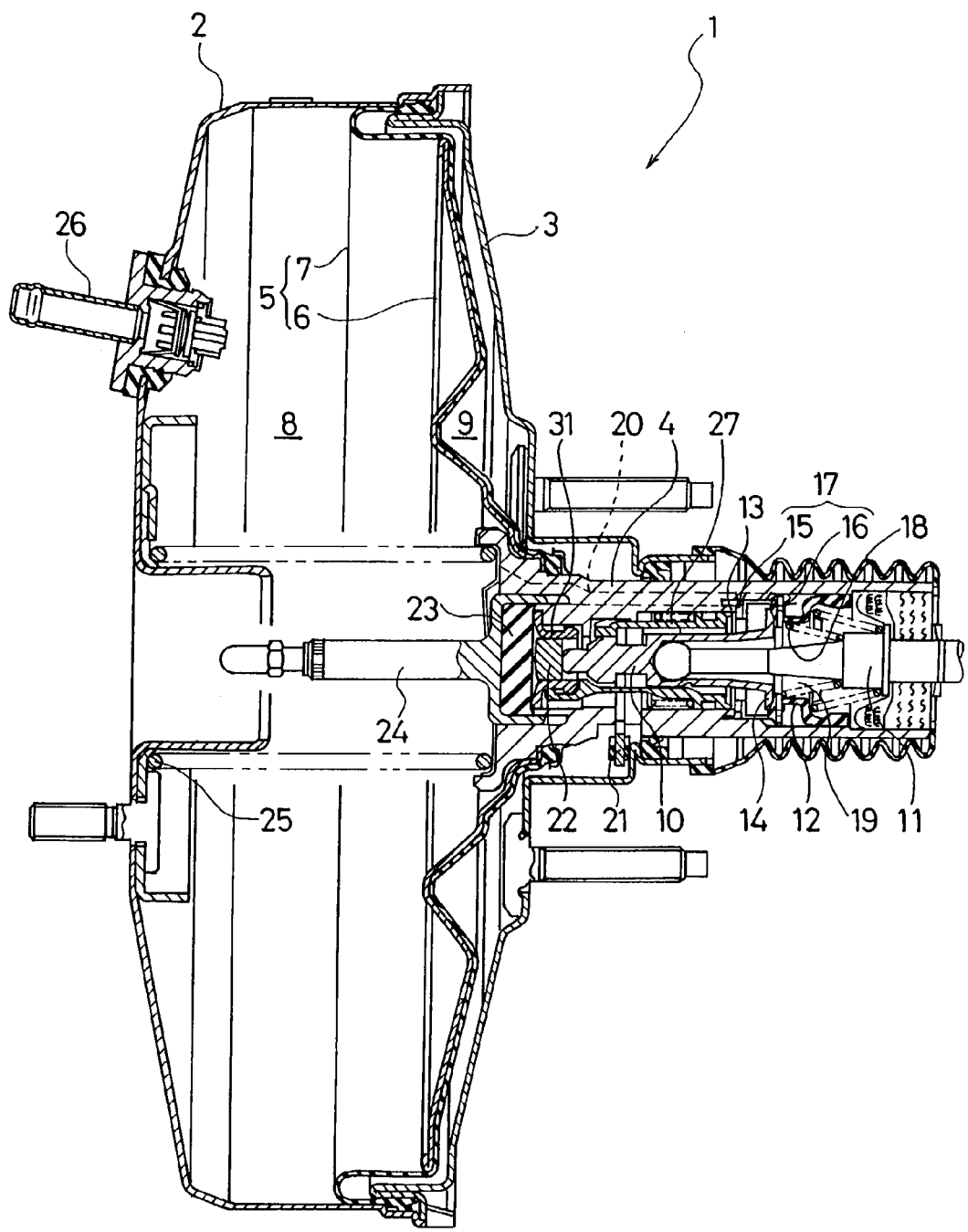
FIG. 1 is a sectional view showing an embodiment of a negative pressure boosting device according to the present invention in its inoperative state.
Figure 2:
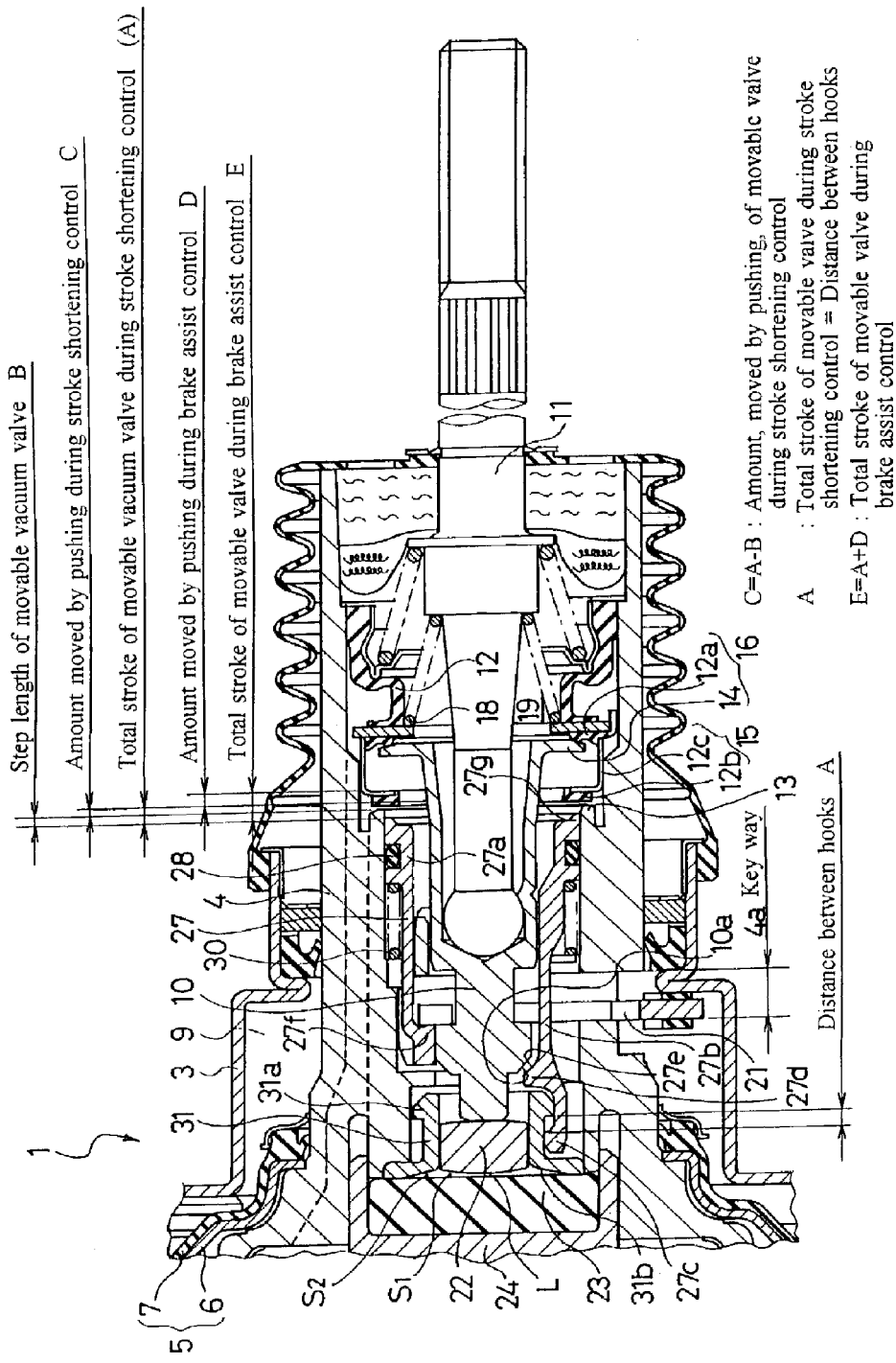
FIG. 2 is an enlarged sectional view showing a portion including a vacuum valve and an atmospheric valve in the negative pressure boosting device shown in FIG. 1.
Figure 3:
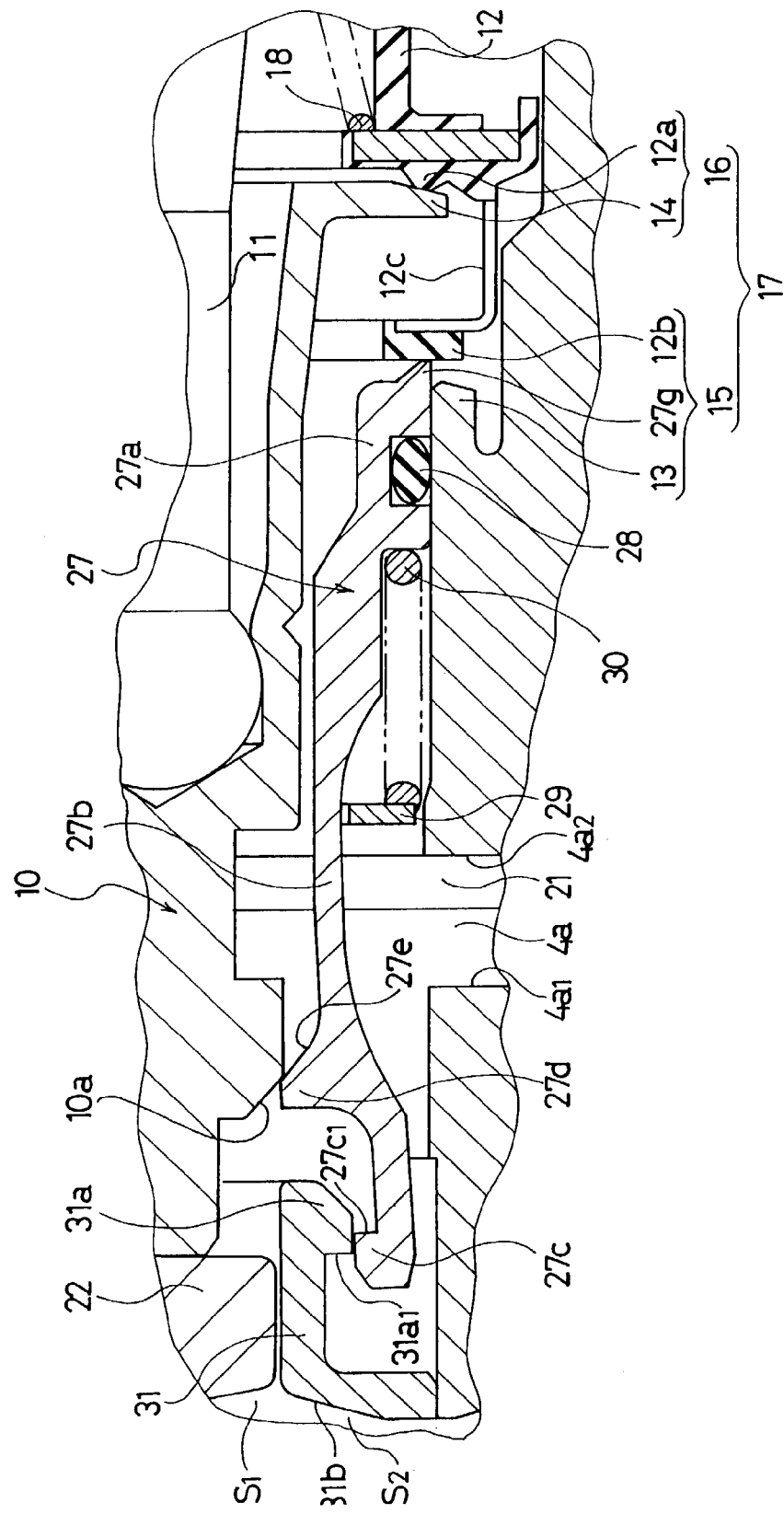
FIG. 3 is a sectional view partially showing the operative state of a cylindrical member in the negative pressure boosting device shown in FIG. 1.
Figure 4:
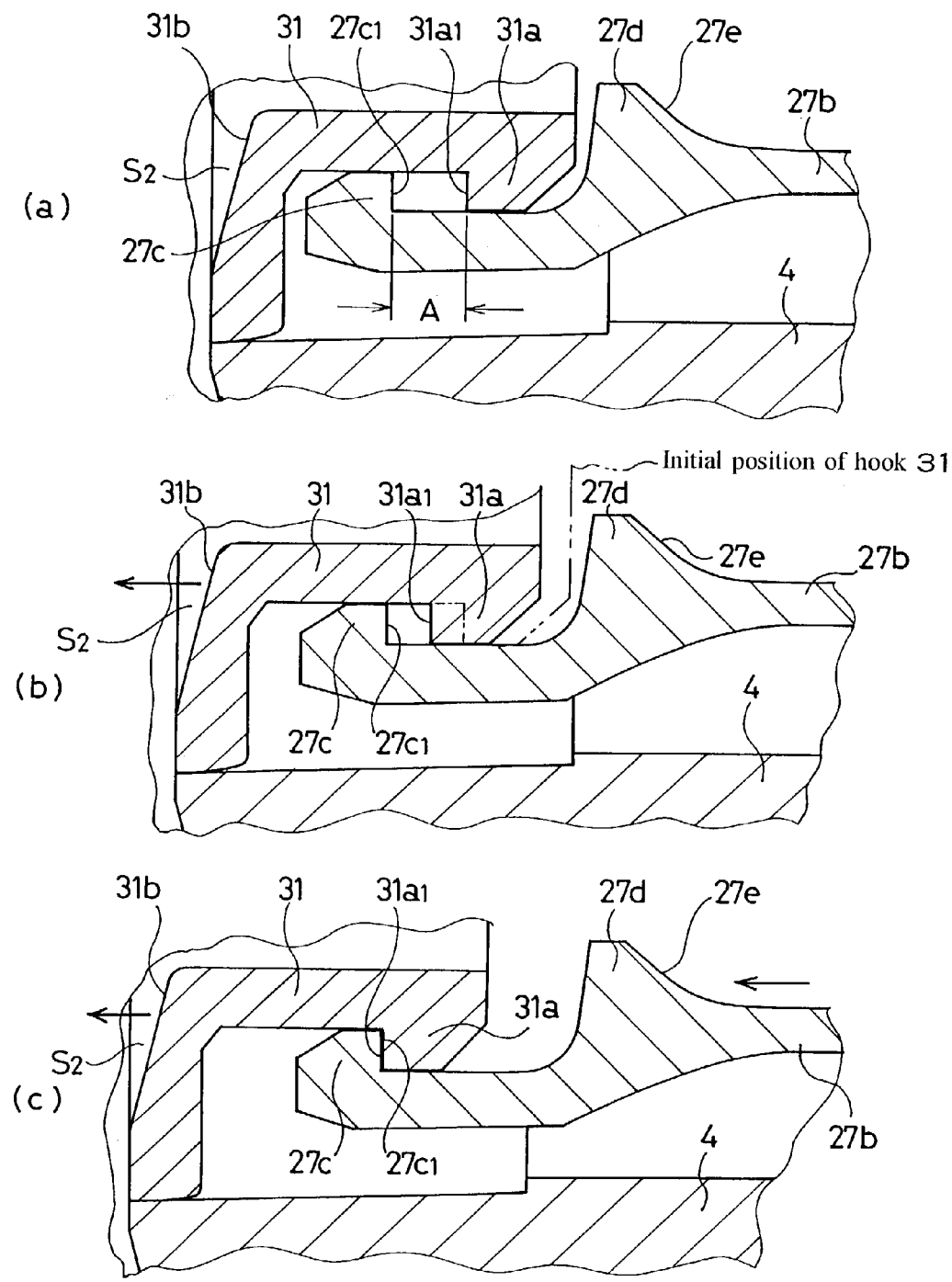

FIG. 1 is a sectional view showing an embodiment of a negative pressure boosting device according to the present invention in its inoperative state, FIG. 2 is an enlarged sectional view showing a portion including a vacuum valve and an atmospheric valve in the negative pressure boosting device shown in FIG. 1, FIG. 3 is a sectional view partially showing the operative state of a cylindrical member in the negative pressure boosting device shown in FIG. 1, and FIGS. 4(a)–4(c) are illustrations for explaining the operation of hooks in the negative pressure boosting device shown in FIG. 1, wherein FIG. 4(a) is a sectional view partially showing the inoperative state where the hooks are not engaged with each other, FIG. 4(b) is a sectional view partially showing a state on the way of operation, and FIG. 4(c) is a sectional view partially showing the state where the hooks are engaged with each other. In the following description, the terms such as "front or fore" and "rear or back" refer to the left and the right, respectively, in the drawings.

It should be noted that component parts in a negative pressure boosting device of this embodiment, similar or corresponding to the parts of the conventional negative pressure boosting device, will be briefly explained. In FIG. 1, numeral 1 designates the negative pressure boosting device; 2 designates a front shell; 3 designates a rear shell; 4 designates a valve body; 5 designates a power piston which is composed of a power piston member 6 attached to the valve body 4 and a diaphragm 7 disposed between the valve body 4 and the shells 2, 3; 8 designates a constant pressure chamber which is formed in a space inside the shells 2, 3 and defined by the power piston 5 and in which negative pressure is always introduced; 9 designates a variable chamber which is formed in the space inside the shells 2, 3 and defined by the power piston 5 and in which atmosphere is introduced when the negative pressure boosting device is operated; 10 designates a valve plunger; 11 designates an input shaft (corresponding to the input member of the present invention) which is connected to a brake pedal (not shown) and controls the operation of the valve plunger 10; 12 designates a valve element disposed in the valve body 4; 13 designates an annular vacuum valve seat formed in the valve body 4; 14 designates an annular atmospheric valve seat formed in the valve plunger 10; 15 designates a vacuum valve which is composed of the valve element 12 and the vacuum valve seat 13 (corresponding to the other vacuum valve seat of the present invention); 16 designates an atmospheric valve which is composed of the valve element 12 and the atmospheric valve seat 14; 17 designates a control valve which is composed of the vacuum valve 15 and the atmospheric valve 16 and selectively controls the connection of the variable pressure chamber 9 between the constant pressure chamber 8 and the atmosphere; 18 designates a valve spring which always urges the valve element 12 in a direction seating the valve element 12 on the vacuum valve seat 13; 19 designates an atmosphere introducing passage; 20 designates a vacuum passage; 21 designates a key member which is inserted into a key way 4a formed in the valve body 4 to restrict the movement of the valve plunger 10 relative to the valve body 4 to a predetermined amount defined according to the axial width of the key way 4a and to define the rearmost positions of the valve body 4 and the valve plunger 10; 22 designates a spacing member; 23 designates a reaction disk; 24 designates an output shaft (corresponding to the output member of the present invention); and 25 designates a return spring; and 26 designates a negative pressure introducing passage connected to a negative pressure source (not shown).

Similarly to the conventional negative pressure boosting device, the output shaft 24 penetrates the front shell 2 in such a manner as to allow the output shaft 24 to move relative to the front shell 2. At the portion where the output shaft 24 penetrates the front shell 2, the contact pressure chamber 8 is airtightly sealed from the atmosphere by a suitable sealing means (not shown). In addition, the valve body 4 penetrates the rear shell 3 in such a manner as to allow the valve shaft 4 to move relative to the rear shell 3. At the portion where the valve body 4 penetrates the rear shell 3, the variable pressure chamber 9 is airtightly sealed from the atmosphere by a cup seal (shown without numeral).

Defined between the front end face of the spacing member 22 and the rear end face of the reaction disk 23, facing to the front end face of the spacing member 22, is a cylindrical space $S_1$ having a predetermined clearance L in the axial direction.

Description will now be made as regard to characterizing portions of the negative pressure boosting device 1 of this embodiment which are different from the conventional negative pressure boosting device.

As shown in FIG. 2, in the negative pressure boosting device 1 of this embodiment, the valve element 12 comprises an atmospheric valve portion 12a (corresponding to the atmospheric valve member of the present invention) which can be seated on the atmospheric valve seat 14 and a vacuum valve portion 12b (corresponding to the vacuum valve member of the present invention) which can be seated on the vacuum valve seat 13. The atmospheric valve portion 12a and the vacuum valve portion 12b are connected to each other by a connecting member 12c so that these valve portions move together.

A cylindrical member 27 is slidably fitted in the axial inner bore of the valve body 4 airtightly by a seal member such as an O-ring. As shown in FIG. 3 as an enlarged partial illustration, the cylindrical member 27 has a cylindrical sliding portion 27a and an engaging arm portion 27b which extends forward from the cylindrical sliding portion 27a and is elastically bendable. The engaging arm portion 27b is in a form of a cantilever having elastic bendability of which the proximal end is the sliding portion 27a and has a hook 27c (corresponding to the cylindrical member-side engaging portion) formed at the free end thereof. The engaging arm portion 27b has a projection 27d formed between the cylindrical sliding portion 27a and the hook 27c. The rear surface of the projection 27d is formed in a tapered surface inclined backward toward the outside and is a pressed face 27e. The cylindrical member 27 further has a stopper portion 27f (shown in FIG. 2) which is formed in the inner periphery thereof and is capable of abutting with the key member 21. At the rear end of the cylindrical member 27, a vacuum valve seat 27g on which the vacuum valve portion 12b of the valve element 12 can be seated is formed. In the negative pressure boosting device 1 of this embodiment, the vacuum valve seat 27g cooperates with the vacuum valve seat 13 to compose the vacuum valve 15 (hereinafter, the vacuum valve seat 13 formed in the valve body 4 is called the first vacuum valve seat 13 and the vacuum valve seat 27g formed in the cylindrical member 27 is called the second vacuum valve seat 27g).

A spring 30 is compressed and disposed between a retainer 29 attached to the valve body 4 and the cylindrical sliding portion 27a of the cylindrical member 27. The cylindrical member 27 is always urged backward by the spring force of the spring 30.

As shown in FIG. 2, at the front end of the valve body 4, the guide 31 is fixed to the valve body 4. The guide 31 slidably guides the spacing member 22 and the hook 27c of the engaging arm portion 27b. As shown in FIG. 4(a) as an enlarged illustration, the guide 31 is provided with a hook 31a (corresponding to the valve body-side engaging portion of the present invention) formed on the outer periphery of a rear end portion of the guide 31. The hook 31a can engage the hook 27c of the engaging arm portion in the axial direction. When the negative pressure boosting device 1 is not operated, as shown in FIG. 4(a), a predetermined distance A is set between a contact face $31a_1$ of the hook 31a and a contact face $27c_1$ of the hook 27c so that the hooks 27c and 31a are set not to engage each other in the axial direction.

The front end face of the guide 31 is formed in a tapered face 31b having a truncated cone shape. The tapered face 31b is inclined backward toward the inner periphery of the guide 31. Because of the tapered face 31b, an annular space S2 is formed between the tapered face 31b and a rear end face of the reaction disk 23 facing to the tapered face 31b when the negative pressure boosting device 1 is not operated.

As shown in FIG. 2, the valve plunger 10 is provided with a press face 10a comprising a tapered face, having a truncated cone shape, and inclined backward toward the outer periphery. The press face 10a is formed to confront the press face 27e of the cylindrical member 27 in the axial direction. According to the forward movement of the valve plunger 10 relative to the cylindrical member 27, the press face 10a of the valve plunger 10 comes in contact with the pressed face 27e of the cylindrical member 27 to press the pressed face 27e.

Since the press face 10a and the pressed face 27e are formed in tapered surfaces as mentioned above, the wedge effect is created when the pressed face 27e is pressed by the press face 10a. Because of this wedge effect, the engaging arm portion 27b is elastically deformed outwardly (downwardly in the drawing) because of the elastic bendability as shown in FIG. 3. The deformation of the engaging arm portion 27b cancels the axial engagement between the hook 27c of the engaging arm portion and the hook 31a of the guide 31. As the axial engagement between the hooks 27b and 31a is cancelled, the cylindrical member 27 moves backward relative to the valve body 4 by the spring force of the spring 30 so that the second vacuum valve seat 27g comes in contact with the vacuum valve portion 12b of the valve element 12 to push the vacuum valve portion 12b and the atmospheric valve portion 12a backward.

In the state where the axial distance A is set between the hooks 27c and 31a, the second vacuum valve seat 27g of the cylindrical member 27 is located ahead of the first vacuum valve seat 13 by a predetermined distance B. In this embodiment, the predetermined distance B is set to be smaller than the predetermined distance A (B<A). In the state where the distance A between the hooks 27c and 31a is extinct so that the hooks 27c and 31a are engaged with each other, because of B<A, the second vacuum valve seat 27g of the cylindrical member 27 projects backward relative to the first vacuum valve seat 13 to push both the vacuum valve portion 12b and the atmospheric valve portion 12a backward.

Assuming that the negative pressure boosting device 1 of this embodiment is adopted to a brake system, the operation of the device will now be described.

(Inoperative State of the Negative Pressure Boosting Device)

In the negative pressure boosting device, negative pressure is always introduced into the constant pressure chamber 8 through the negative pressure introducing passage 25. In the inoperative state of the negative pressure boosting device 1 as shown in FIG. 1 and FIG. 2, the key member 21 abuts on the rear shell 3 and is therefore located at the rearmost position. By the key member 21, the valve body 4 and the valve plunger 6 are located at their rearmost positions and the power piston 5, the input shaft 11, and the output shaft 24 are also located at their rearmost positions. In this inoperative state, the atmospheric valve portion 12a of the valve element 12 is seated on the atmospheric valve seat 14 and the vacuum valve portion 12b of the valve element 12 is spaced apart from the first vacuum valve seat 13 and the second vacuum valve seat 27g. Therefore, the variable pressure chamber 9 is isolated from the atmosphere and is in communication with the constant pressure chamber 8 so that the negative pressure is introduced into the variable pressure chamber 9. This means that there is substantially no pressure difference between the variable pressure chamber 9 and the constant pressure chamber 8.

The stopper portion 27f of the cylindrical member 27 abuts on the key member 21 to restrict the backward movement of the cylindrical member 27, thereby defining the initial position of the cylindrical member 27 relative to the valve body 4. In this state, there is the axial space A between the hooks 27c and 31a so that the hooks 27c and 31a are not engaged with each other and the second vacuum valve seat 27g is located ahead of the first vacuum valve seat 13 by the predetermined distance B. The press face 10a of the valve plunger 10 is positioned behind the pressed face 27e of the projection 27d of the engaging arm portion 27b by a predetermined distance to confront the pressed face 27e in the axial direction.

(Service Braking Operation)

As the brake pedal is depressed at a normal speed for service braking operation, the input shaft 11 moves forward so that the valve plunger 10 moves forward. Therefore, the vacuum valve portion 12b of the valve element 12 is seated on the first vacuum valve seat 13 and, at the same time, the atmospheric vacuum valve seat 14 is spaced apart from the atmospheric valve portion 12a of the valve element 12, thereby closing the vacuum valve 15 and opening the atmospheric valve 16. That is, the variable pressure chamber 9 is isolated from the constant pressure chamber 8 and is in communication with the atmosphere. The atmosphere is therefore introduced into the variable pressure chamber 9 through the atmosphere introducing passage 19 and the open atmospheric valve 16. As a result, a pressure difference is created between the variable pressure chamber 9 and the constant pressure chamber 8 so as to move the power piston 5 forward and further move the output shaft 24 forward via the valve body 4, thereby moving the piston of the master cylinder (not shown) forward.

In the initial stage of operation of the negative pressure boosting device 1, the hooks 27c and 31a are not engaged with each other in the axial direction and the cylindrical member 27 is held at its initial position even when the valve body 4 moves forward because of the spring force of the spring 30 and the contact between the stopper portion 27f and the key member 21. Accordingly, the valve body 4 and the output shaft 24 move forward relative to the cylindrical member 27. Then, as shown in FIG. 4(b), the hook 31a of the guide 31 comes closer to the hook 27c of the cylindrical member to shorten the distance between the engaging faces $27c_1$ and $31a_1$ which was the space A at the initiation. Accordingly, in the initial stage of the operation of the negative pressure boosting device 1, the stroke of the valve body 4 and the stroke of the output shaft 24 are longer than the stroke of the input shaft 11. In other words, in the initial stage of the operation of the negative pressure boosting device 1, the stroke of the input shaft 11 is shortened as compared to the conventional negative pressure boosting device for the same stroke of the output shaft 24. As a result, the pedal stroke is also shortened. In a portion of the brake system between the master cylinder and the wheel cylinders, the loss stroke as mentioned above can be effectively absorbed by shorter stroke of the input shaft 11 (i.e. shorter pedal stroke).

By the forward movement of the valve body 4 relative to the cylindrical member 27 by a predetermined distance (that is, the valve body 4 moves relative to the second vacuum valve seat 27g by the predetermined distance), the distance between the engaging surfaces $27c_1$, $31a_1$ is extinct so that the hooks 27c, 31a are engaged with each other as shown in FIG. 4(c). After that, the cylindrical member 27 moves together with the valve body 4. In this manner, the operation of shortening the stroke of the input shaft 11 is accomplished. As mentioned above, the hooks 27c, 31a compose the input stroke shortening means of the present invention.

Since the relation B<A is set, in the state where the hooks 27c and 31a are engaged with each other, the second vacuum valve seat 27g projects backward relative to the first vacuum valve seat 13. The vacuum valve portion 12b and the atmospheric valve portion 12a are both pushed backward. The amount C moved by pushing is obtained by:

$$C=A-B$$

In this case, the distance A is the total stroke of the cylindrical member 27 during the stroke shortening operation as shown in FIG. 2. The words in FIG. 2 will be expressed. Either of the movable vacuum valve and the movable valve is the cylindrical member 27 and the step length of the movable vacuum valve is the aforementioned distance B.

On the other hand, since the atmospheric valve portion 12a is pushed backward, the space is created between the atmospheric valve portion 12a and the atmospheric valve seat 14, that is, the atmospheric valve 16 is opened in the same manner as the conventional negative pressure boosting device.

The forward movement of the valve plunger 10 moves the spacing member 22 forward. At this point, however, the spacing member 22 does not come in contact with the reaction disk 23 yet so that the reaction force is not transmitted from the output shaft 24 to the brake pedal via the reaction disk 23, the spacing member 22, valve plunger 10, and the input shaft 11. As the input shaft 11 further moves forward, the power piston 5 further moves forward, thereby further moving the piston of the master cylinder forward through the valve body 4 and the output shaft 24.

As the loss stroke is extinct, the negative pressure boosting device 1 substantially produces an output. By this output, the master cylinder produces a master cylinder pressure. By this master cylinder pressure, the wheel cylinders are actuated to produce braking force.

Figure 6:
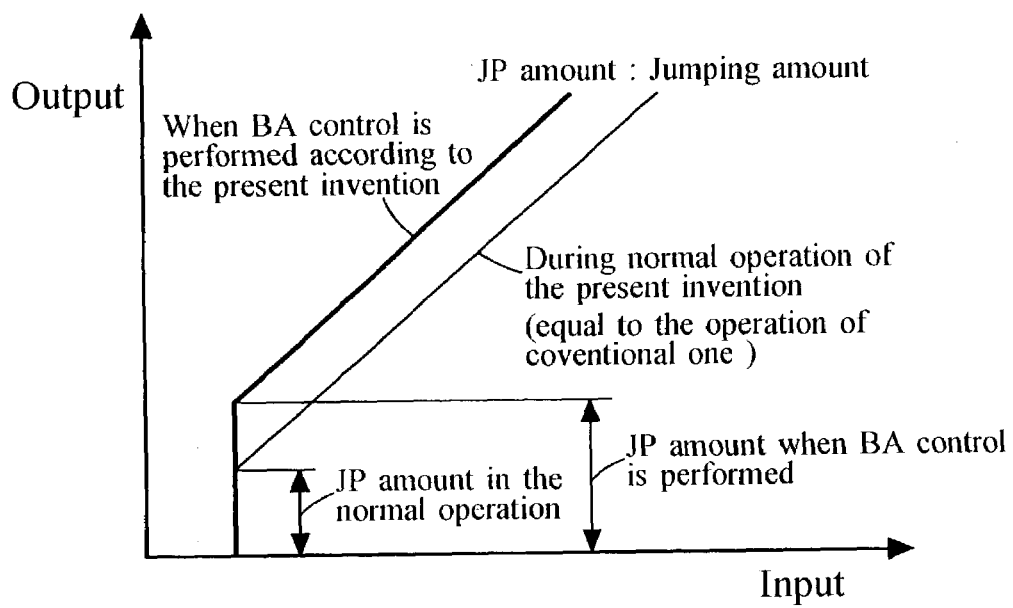
FIG. 6 is a graph showing the input-output characteristics of the negative pressure boosting device according to the present invention and the conventional negative pressure boosting device having jumping characteristics.

At this point, brake reaction force exerted on the output shaft 24 from the master cylinder makes the reaction disk 23 to swell backward, whereby the spacing member 22 abuts on the reaction disk 23. Accordingly, the reaction force starts to be transmitted from the output shaft 24 to the brake pedal through the reaction disk 23, the spacing member 22, the valve plunger 10, and the input shaft 11. That is, the negative pressure boosting device 1 produces an output corresponding to the input and exhibits the jumping characteristic in the service braking operation as shown in FIG. 6.

In this case, the valve body 4 moves relative to the valve plunger 10 and the spacing member 22 so that the clearance L between the reaction disk 23 and the spacing member 22 is enlarged. Since a space S2 is ensured by the tapered face 31b of the guide 31, the reaction disk 23 easily swells into the space S2 SO as to absorb the enlarged clearance L. Accordingly, the jumping characteristic of the negative pressure boosting device of this embodiment is nearly equal to the jumping characteristic of the conventional negative pressure boosting device. The stroke of the input shaft 11 is shortened without significantly changing the jumping characteristic, thereby providing the same brake feeling as the conventional negative pressure boosting device.

As the output of the negative pressure boosting device 1 becomes equal to a predetermined value which is a value obtained by amplifying the input of the input shaft 11 according to a servo ratio, the atmospheric valve portion 12a is seated on the atmospheric valve seat 14 to close the atmospheric valve 16 (the vacuum valve 15 is already closed since the vacuum valve portion 12b is seated on the second vacuum valve seat 27g), that is, the negative pressure boosting device 1 becomes in a balanced state in the middle load region. As a result, the wheel cylinders produce relatively large braking force i.e. amplified pedaling force. The service braking is operated with this braking force.

As the brake pedal is released in order to cancel the service braking from the state in which the atmospheric valve 16 and the vacuum valve 15 of the negative pressure boosting device 1 are both closed as shown in FIG. 3, the input shaft 11 and the valve plunger 10 are both intended to move backward. Since air (atmosphere) is introduced into the variable chamber 9, however, the valve body 4 and the cylindrical member 27 do not immediately move backward. Therefore, the atmospheric valve seat 14 of the valve plunger 10 presses the atmospheric valve portion 12a of the valve element 12 backward so that the vacuum valve portion 12b is spaced apart from the second vacuum valve seat 27g to open the vacuum valve 15. Then, the variable pressure chamber 9 becomes in communication with the constant pressure chamber 8 via the open vacuum valve 15 and the vacuum passage 20. The air in the variable pressure chamber 9 is discharged to the vacuum source through the open vacuum valve 15, the vacuum passage 20, the constant pressure chamber 8, and the negative pressure introducing passage 26.

Therefore, the inner pressure of the variable pressure chamber 9 is lowered to reduce the pressure difference between the variable pressure chamber 9 and the constant pressure chamber 8. Accordingly, the power piston 5, the valve body 4, and the output shaft 24 move backward because of the spring force of the return spring 25. According to the backward movement of the valve body 4, the piston of the master cylinder and the output shaft 24 are also moved backward by the spring force of the return spring of the piston of the master cylinder, thereby initiating cancellation of the service braking.

As the key member 21 comes in contact with the rear shell 3 as shown in FIG. 2, the key member 21 is stopped from further moving backward. However, the valve body 4, the cylindrical member 27, the valve plunger 10, and the input shaft 11 further move backward. First, the stopper portion 27f of the cylindrical member 27 comes in contact with the key member 21 as shown in FIG. 2 and is therefore stopped from further moving backward. Since the valve body 4, the valve plunger 10, and the input shaft 11 further move backward, however, the cylindrical member 27 move forward relative to the valve body 4. Accordingly, the second vacuum valve seat 27g is positioned ahead of the first vacuum valve seat 13.

The valve plunger 10 comes in contact with the key member 21 as shown in FIG. 2 and is therefore stopped from further moving backward. Further, the front end 4$a_1$ of the key way 4a of the valve body 4 comes in contact with the key member 21 as shown in FIG. 2 so that the valve body 4 is stopped from further moving backward. In this manner, the master cylinder is returned in its inoperative state so that the master cylinder pressure dies out. At the same time, the wheel cylinders are returned in their inoperative states so that the braking force dies out, thereby canceling the service braking.

(Emergency Braking Operation)

As the brake pedal is depressed at a speed larger than the normal speed in order to conduct the emergency braking, the BA control is performed. That is, by the rapid depression of the brake pedal, the input shaft 11 and the valve plunger 10 move forward relative to the valve body 4, the cylindrical member 27, and the guide 31 by an amount larger than that in case of the service braking. Therefore, similarly to the service braking, the vacuum valve portion 12b is seated on the first vacuum valve seat 13 to close the vacuum valve 15 and the atmospheric valve seat 14 is spaced apart from the atmospheric valve portion 12a to open the atmospheric valve 16. Accordingly, the valve body 4 and the output shaft 24 move forward so as to cancel the aforesaid loss stroke, similarly to the service braking. At this point, since the cylindrical member 27 does not move forward, the valve body 4 moves forward relative to the cylindrical member 27 so that hook 31a of the guide engages the hook 27c of the engaging arm portion in the axial direction. After that, because of this engagement, the cylindrical member 27 and the valve body 4 move together.

Since the valve plunger 10 largely moves forward, the press face 10a comes into contact with the pressed face 27e of the engaging arm portion 27b to press the pressed face 27e forward. Then, since the press face 10a and the pressed face 27e are formed in tapered surfaces, the engaging arm portion 27b is elastically deformed outwardly by wedge effect created between the press face 10a and the pressed face 27e as shown in FIG. 3 as mentioned above. The deformation of the engaging arm portion 27b cancels the engagement between the hook 27c and the hook 31a. As the engagement between the hooks 27b and 31a is cancelled, the cylindrical member 27 is moved backward largely relative to the valve body 4 by the spring force of the spring 30. At this point, the rear end face of the key member 21 abuts on the rear end 4$a_2$ of the key way 4a of the valve body 4 so that the key member 21 is prevented from moving backward relative to the valve body 4. As the stopper portion 27f of the cylindrical member 27 comes in contact with the key member 21, the cylindrical member 27 is stopped from moving relative to the valve body 4 and is thus prevented from further moving backward. In this state, the projection 27d of the engaging arm portion 27b is held in contact with the press face 10a of the valve plunger 10 or the outer peripheral surface of the valve plunger 10 as an extending portion of the press face 10a so that the hook 27c is held in such a position not to engage the hook 31a.

The backward movement of the cylindrical member 27 brings the second vacuum valve seat 27g into contact with the vacuum valve portion 12b of the valve element 12 and pushes the vacuum valve portion 12b and the atmospheric valve portion 12a backward. Assuming the amount moved by pushing as D, the total stroke E of the cylindrical member 27 relative to the valve body 4 is obtained by:

$$E=A+D$$

Since the vacuum valve portion 12b is pushed backward, the vacuum valve portion 12b is spaced apart from the first vacuum valve seat 13. However, the second vacuum valve seat 27g still abuts on the vacuum valve portion 12b so that the vacuum valve 15 is still closed. Since the atmospheric valve portion 12a is pushed backward, the atmospheric valve portion 12a is spaced apart from the atmospheric valve seat 14 more rapidly than that of the service braking so as to open the atmospheric valve 16, whereby the atmosphere is introduced into the variable pressure chamber. Therefore, the valve body 4 moves forward, the atmospheric valve portion 12a is seated on the atmospheric valve seat 14 to close the atmospheric valve 16 again. The negative pressure boosting device 1 becomes in a balanced state in the middle load region in which, as for the control valve 17, the vacuum valve 15 and the atmospheric valve 16 are both closed.

In the BA control operation, the balanced position of the vacuum valve 15 and the atmospheric valve 16 is shifted backward compared to the normal operation, thereby creating a clearance L larger than that in case of normal operation between the spacing member 22 and the reaction disk 23. This clearance L functions as a clearance for increasing the jumping amount (JP amount) of the negative pressure boosting device 1.

Therefore, as shown in FIG. 6, the jumping amount (JP amount) of the negative pressure boosting device 1 is increased as compared to the normal operation so that the negative pressure boosting device 1 rapidly produces an output larger than that in case of service braking, thereby rapidly and effectively conducting the emergency braking.

The rapid output intensifying means of the present invention is composed of sliding portion 27a, the engaging arm portion 27b, the hooks 27c and 31a, the pressed face 27e of the projection 27d, the press face 10a of the valve plunger 10, and the spring 30.

As the brake pedal is released in order to cancel the emergency braking, the input shaft 11 and the valve plunger 10 move backward in the same manner as the aforementioned service braking. Since the air (atmosphere) is introduced into the variable pressure chamber 9, however, the valve body 4 and the cylindrical member 27 do not immediately move backward. Therefore, the atmospheric valve seat 14 of the valve plunger 10 presses the atmospheric valve portion 12a of the valve element 12 backward so that the vacuum valve portion 12b is spaced apart from the second vacuum valve seat 27g to open the vacuum valve 15. Then, the variable pressure chamber 9 becomes in communication with the constant pressure chamber 8 via the open vacuum valve 15 and the vacuum passage 20. The air in the variable pressure chamber 9 is discharged to the vacuum source through the open vacuum valve 15, the vacuum passage 20, the constant pressure chamber 8, and the negative pressure introducing passage 26.

The pressing force of the press face 10a of the valve plunger 10 relative to the pressed face 27e of the engaging arm portion 27b is reduced so that the deformation of the engaging arm portion 27b is reduced because of its elasticity.

On the other hand, the inner pressure of the variable pressure chamber 9 is lowered to reduce the pressure difference between the variable pressure chamber 9 and the constant pressure chamber 8. Accordingly, the power piston 5, the valve body 4, and the output shaft 24 move backward because of the spring force of the return spring 25. According to the backward movement of the valve body 4, the piston of the master cylinder and the output shaft 24 are also moved backward by the spring force of the return spring of the piston of the master cylinder, thereby initiating cancellation of the emergency braking.

As the key member 21 comes in contact with the rear shell 3 as shown in FIG. 2, the key member 21 is stopped from further moving backward. In addition, since the stopper portion 27f abuts on the key member 21, the cylindrical member 27 is stopped from further moving backward. However, the valve body 4, the valve plunger 10, and the input shaft 11 further move backward so that the cylindrical member 27 moves forward relative to the valve body 4. Accordingly, the second vacuum valve seat 27g is positioned ahead of the first vacuum valve seat 13. In addition, the press face 10a is spaced apart from the pressed face 27e, that is, does not press the pressed face 27e now. At the same time, the hook 31a moves backward relative to the hook 27c so as to cancel the radial overlapping between the hook 31a and the hook 27c so that the engaging arm portion 27 returns to its initial state because of its elasticity.

Then the valve plunger 10 comes in contact with the key member 21 as shown in FIG. 2 and is thus prevented from further moving backward. In addition, the front end 4a1 of the key way 4a of the valve body 4 comes in contact with the key member 21 as shown in FIG. 2, so that the valve body 4 is thus prevented from further moving backward. In this manner, the negative pressure boosting device 1 becomes in the initial inoperative state as shown in FIG. 1 and FIG. 2. Therefore, the master cylinder becomes in its inoperative state so that the master cylinder pressure dies out. At the same time, the wheel cylinders become in their inoperative states so that the braking force dies out, thereby canceling the emergency braking.

By employing the negative pressure boosting device 1 of this embodiment in a brake system, a large stroke of the output shaft 24 can be obtained while the stroke of the input shaft 11 is shortened. Therefore, the loss stroke in a portion of the brake system between the master cylinder and the wheel cylinders can be effectively cancelled with a small pedal stroke in the initial stage of the braking operation.

In the event of emergency braking, the output of the negative pressure boosting device can be rapidly intensified by rapidly opening the atmospheric valve 16 to increase the jumping amount. The BA control is therefore performed, thereby rapidly and effectively operating the emergency braking.

The brake control can be improved because it can not only shorten the stroke of the input shaft 11 but also perform the BA control.

Though the negative pressure boosting device is designed to perform these controls, the number of parts can be reduced and the cost can be reduced because the cylindrical member 27 employed is common to the control for shortening the stroke of the input shaft 11 and the BA control. Further, since the mechanical structure composed of the cylindrical member 27 is employed, these controls can be securely performed with simple structure, thereby improving the reliability and making the device compact.

Figure 5:
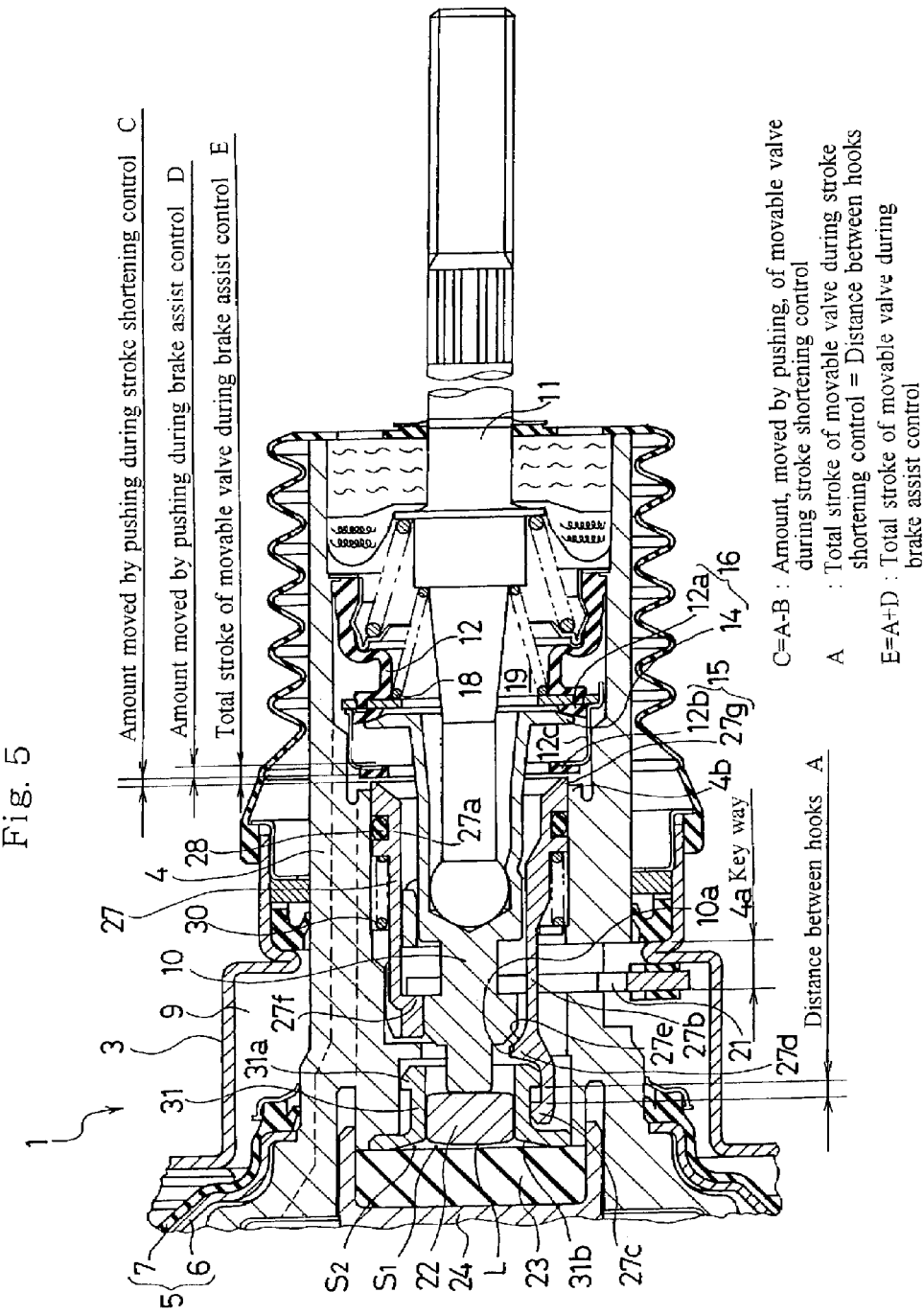
FIG. 5 is a partial enlarged sectional view similar to FIG. 2, showing another embodiment of a negative pressure boosting device according to the present invention in its inoperative state.

FIG. 5 is a partial enlarged sectional view similar to FIG. 2, showing another embodiment of a negative pressure boosting device according to the present invention in its inoperative state. It should be noted that component parts similar or corresponding to the parts of the aforementioned embodiment are designated with the same reference numerals, thus omitting the detail description of such component parts.

In the aforementioned embodiment, the first vacuum valve seat 13 is formed in the valve body 4 and is positioned behind the second vacuum valve seat 27g of the cylindrical member 27 when the negative pressure boosting device 1 is not operated. However, in a negative pressure boosting device 1 of this embodiment as shown in FIG. 5, the first valve seat 13 is not formed in the valve body 4 and a portion 4b of the valve body 4 corresponding to the first valve seat 13 of the former embodiment is positioned ahead of the first valve seat 13 of the former embodiment. That is, the negative pressure boosting device 1 of this embodiment has only one vacuum valve seat of the vacuum valve 15, i.e. the second vacuum valve seat 27g formed in the cylindrical member 27. The second vacuum valve seat 27g projects backward relative to the portion 4b.

The other structure of the negative pressure boosting device 1 of this embodiment is the same as that of the negative pressure boosting device 1 of the former embodiment.

Assuming that the negative pressure boosting device 1 of this embodiment is adopted to a brake system, the operation of the device will now be described.

In the negative pressure boosting device 1 of the former embodiment, as the input shaft 11 moves forward for the braking operation, first the vacuum valve portion 12b is seated on the first vacuum valve seat 13 of the valve body 4. In the negative pressure boosting device 1 of this embodiment, however, as the input shaft 11 moves forward, the vacuum valve portion 12b is seated directly on the second vacuum valve seat 27g of the cylindrical member 27.

The amount C moved by pushing during the shortening of the stroke in the negative pressure boosting device 1 of this embodiment is obtained by:

$$C=A$$

because B=0.

The other actions of the negative pressure boosting device 1 of this embodiment are substantially the same as those of the former embodiment except actions relating to the first vacuum valve seat 13.

In the negative pressure boosting device 1 of this embodiment, the predetermined distance B as a voidable stroke of the cylindrical member 27 in the former embodiment does not exist so that the axial length of the negative pressure boosting device 1 can be shortened for the predetermined distance B.

The other works and effects of the negative pressure boosting device 1 of this embodiment are also substantially the same as those of the former embodiment.

Though the input stroke shortening means is composed of the hooks 27c and 31ac in the aforementioned embodiments, the present invention is not limited thereto. That is, the input stroke shortening means may be of any construction which can shorten the stroke of the input shaft 11 at the initial stage of the operation and can be adopted to the negative pressure boosting device. Though the rapid output intensifying means is composed of the engaging arm portion 27b, the hook 27c, the projection 27d, the pressed face 27e, the second vacuum valve seat 27g as a movable valve seat, the hook 31a formed on the guide 31, and the spring 30, the present invention is not limited thereto. That is, the rapid output intensifying means may be of any structure which can rapidly intensify the output during the emergency braking operation and can be adopted to the negative pressure boosting device.

Though the present invention is adopted to a negative pressure boosting device of a single type having only one power piston 5 in the aforementioned embodiments, the present invention can be adopted to a negative pressure boosting device of a tandem type having a plurality of power pistons 5.

Though the negative pressure boosting device of the present invention is adopted to the brake system in the aforementioned embodiment, the negative pressure boosting device of the present invention can be adopted to other system or device employing a negative pressure boosting device.

As apparent from the above description, according to the negative pressure boosting device of the present invention, the stroke of the input member can be effectively shortened in the initial stage of the operation relative to the stroke of the output member by the input stroke shortening means and, in addition, the output can be intensified more rapidly than that of the normal operation when the input member is operated more rapidly than that for the normal operation by the rapid output intensifying means. Therefore, the negative pressure boosting device of the present invention can perform improved boosting control.

Further, according to the negative pressure boosting device of the present invention, the stroke of the input shaft can be effectively shortened in the initial stage of the operation relative to the stroke of the output shaft by the input stroke shortening means and, in addition, the output can be intensified more rapidly than that of the normal operation when the input shaft is operated more rapidly than that for the normal operation by the rapid output intensifying means. Therefore, the negative pressure boosting device of the present invention can perform improved boosting control.

Though the negative pressure boosting device is designed to perform these controls, the number of parts can be reduced and the cost can be reduced because the cylindrical member employed is common to the control for shortening the stroke of the input shaft and the control for rapidly intensifying the output. Further, since the mechanical structure composed of the cylindrical member is employed, these controls can be securely performed with simple structure, thereby improving the reliability and making the device compact.

By employing the negative pressure boosting device of the present invention as a brake booster, even if a brake system has a loss stroke as mentioned above, the loss stroke can be effectively cancelled with shortening the pedal stroke of a brake pedal in the initial stage of braking operation and, in addition, for the event of emergency braking, the braking force can be intensified more rapidly than that of the service braking, thereby rapidly and effectively performing the emergency braking. The brake control can be improved because it can not only shorten the pedal stroke of the brake pedal but also perform the BA control.

What we claim is:
1. A negative pressure boosting device comprising:
   a valve body which is arranged to freely move forward and backward relative to a space defined by a shell and airtightly and slidably penetrates said shell;
   a power piston which is connected to said valve body and divides said space into a constant pressure chamber in which negative pressure is introduced and a variable pressure chamber in which atmosphere is introduced during operation;

a valve plunger which is movably arranged in said valve body;

an input shaft which is connected to said valve plunger and is arranged in said valve body to allow forward and backward movements of said input shaft relative to said valve body;

an output shaft which moves together with said valve body by operation of said power piston to produce an output;

a vacuum valve which is arranged in said valve body and is controlled by forward and backward movements of said valve plunger to impede or allow communication between said constant pressure chamber and said variable pressure chamber;

an atmospheric valve which is arranged in said valve body and is controlled by the forward and backward movements of said valve plunger to impede or allow communication between said variable pressure chamber and the atmosphere;

input stroke shortening means for shortening a stroke of said input shaft relative to a stroke of said output shaft in an initial stage of operation, said input stroke shortening means increasing an opening of the atmospheric valve by pushing backward the atmospheric valve in an initial stage of a normal operation; and rapid output intensifying means for intensifying said output more rapidly than that of the normal operation when said input shaft is operated more rapidly than that for the normal operation.

2. A negative pressure boosting device as claimed in claim 1, wherein said vacuum valve comprises a vacuum valve member which is arranged in said valve body and a vacuum valve seat which is arranged movably relative to said valve body and on which said vacuum valve member can be seated, and said input stroke shortening means moves said valve body relative to said vacuum valve seat in the initial stage of the operation and then moves said vacuum valve seat together with said valve body after said valve body is moved by a predetermined distance relative to said vacuum valve seat.

3. A negative pressure boosting device as claimed in claim 2, wherein said rapid output intensifying means is actuated when said input shaft is operated more rapidly than that for the normal operation and rapidly opens said atmospheric valve to increase a jumping amount so as to obtain the output larger than that of the normal operation.

4. A negative pressure boosting device as claimed in claim 1, wherein said rapid output intensifying means is actuated when said input shaft is operated more rapidly than that for the normal operation and rapidly opens said atmospheric valve to increase a jumping amount so as to obtain the output larger than that of the normal operation.

5. A negative pressure boosting device as claimed in claim 4, wherein said atmospheric valve comprises an atmospheric valve member which is arranged in said valve body and an atmospheric valve seat which is provided on said valve plunger and on which said atmospheric valve member is seated, and said rapid output intensifying means is actuated when said input shaft is operated more rapidly than that for the normal operation and moves said vacuum valve, said atmospheric valve member, and said atmospheric valve seat backward relative to said valve body more largely than that of the normal operation.

6. A negative pressure boosting device as claimed in claim 1, wherein said vacuum valve comprises a vacuum valve member which is arranged in said valve body and a vacuum valve seat which is arranged movably relative to said valve body and on which said vacuum valve member can be seated;

said atmospheric valve comprises an atmospheric valve member which is arranged in said valve body and an atmospheric valve seat which is provided on said valve plunger and on which said atmospheric valve member is seated;

said vacuum valve member and said atmospheric valve member are movable together;

a cylindrical member having said vacuum valve seat on one end thereof is disposed airtightly and slidably relative to said valve body;

said input stroke shortening means comprises a valve body-side engaging portion provided on said valve body and a cylindrical member-side engaging portion provided on said cylindrical member which is set to have a predetermined distance from said valve body-side engaging portion when the negative pressure booster device is not operated, wherein said valve body-side engaging portion and said cylindrical member-side engaging portion are not engaged with each other in the initial stage of the operation, and said valve body-side engaging portion and said cylindrical member-side engaging portion are engaged with each other after said valve body moves relative to said cylindrical member to cancel said predetermined distance therebetween, thereby moving said cylindrical member together with said valve body; and said rapid output intensifying means moves said atmospheric valve member and said atmospheric valve seat backward more largely than that of the normal operation by an operation such that said cylindrical member pushes said vacuum valve member when said input shaft is operated more rapidly than that for the normal operation.

7. A negative pressure boosting device as claimed in claim 6, wherein said valve body is provided with an additional vacuum valve seat for said vacuum valve, said vacuum valve member is seated on said additional vacuum valve seat at a beginning of operation in which control for shortening the stroke of said input shaft is performed by said input stroke shortening means, and said vacuum valve member is seated on the vacuum valve seat provided on said cylindrical member during and after the operation in which the control for shortening the stroke of said input shaft is performed by said input stroke shortening means.

* * * * *